Feb. 14, 1950 — R. J. ABSHIRE — 2,497,570
COMBINATION GAUGE AND SPOT MARKER
Filed April 1, 1949
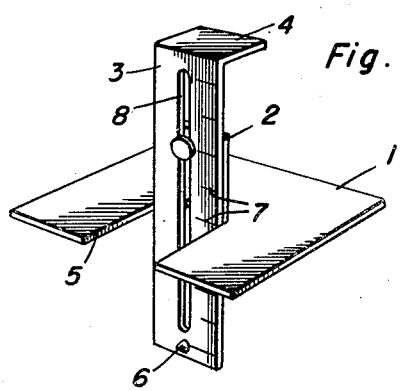
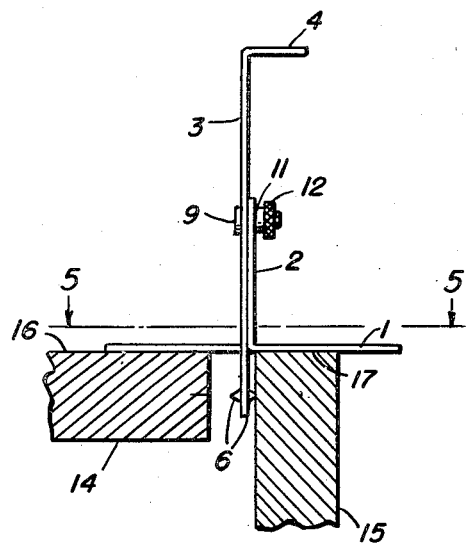
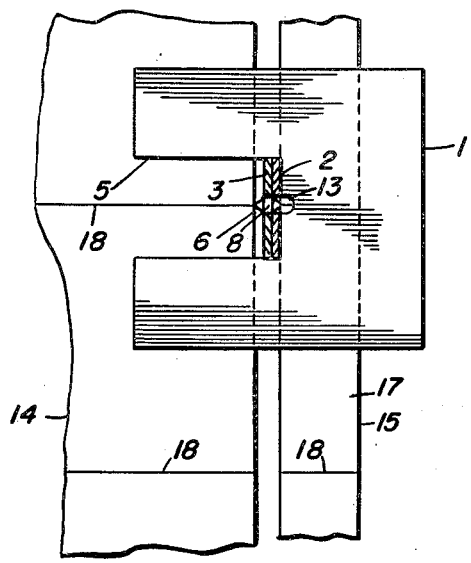
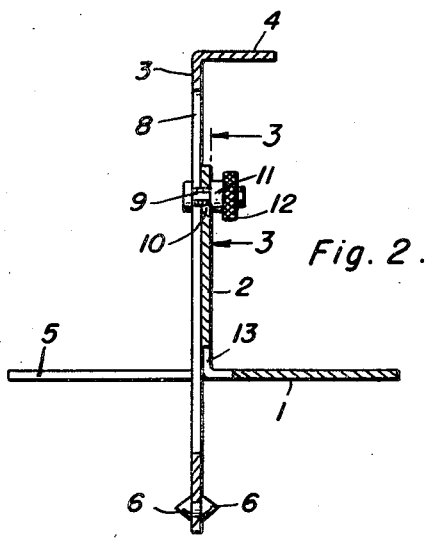
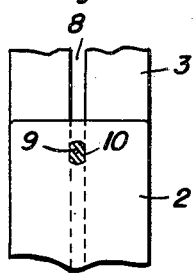
Inventor
Richard J. Abshire
By *Clarence A. O'Brien and Harvey B. Jacobson*
Attorneys Patented Feb. 14, 1950

2,497,570

UNITED STATES PATENT OFFICE 2,497,570

COMBINATION GAUGE AND SPOT MARKER

Richard J. Abshire, Pomona, Calif.

Application April 1, 1949, Serial No. 84,921

3 Claims. (Cl. 33—189)

My invention relates to improvements in combination gauges and spot markers for use in locating in opposite panels of wood, or the like, centers for dowel pins for joining the panels together.

The primary object of the invention is to provide a simply constructed, inexpensive device for gauging and spot marking centers for dowel pins in coincidence in opposite panels of wood, and which is easy to handle, accurate and not liable to get out of order from prolonged use.

Other and subordinate objects, within the purview of my invention, together with the precise nature of my improvements will be readily understood when the succeeding description and claims are read with reference to the drawing accompanying and forming part of this specification.

In said drawing:

Figure 1 is a view in perspective of my improved gauge and spot marker in the preferred embodiment thereof;

Figure 2 is a view in vertical central section drawn to a larger scale;

Figure 3 is a fragmentary view in vertical section taken on the line 3—3 of Figure 2;

Figure 4 is a view partly in side elevation and partly in section illustrating the use of the invention;

Figure 5 is a view in horizontal section taken on the line 5—5 of Figure 4.

Referring to the drawing by numerals, as shown therein, the gauge and spot marker of my invention comprises a rectangular base plate 1 of any suitable material, preferably thin plate steel, and from one side of which a flat tongue 2 is cut out of said plate and bent up outwardly thereof into right angle position in the approximate center of said plate.

A gauge bar 3, preferably of a lighter and more resilient material than the base plate 1, and which is relatively longer than the tongue 2 is slidably fitted edgewise in the cut-out 5 of said base plate 1 for endwise adjustment alongside said tongue 2 in a plane at a right angle to that of said base plate 1. Means, presently described, is provided for clamping the gauge bar 3 flat against one side of the tongue 2 in different adjusted positions of said gauge bar. At one end of the gauge bar 3, constituting the outer end thereof, a right angled ear 4 is bent thereon to provide a finger-grip for adjusting said bar 3. At the opposite end of the gauge bar 3, constituting the inner end thereof, a pair of aligned marker studs 6, of conical shape, are provided at opposite sides of said bar and in the longitudinal center thereof. On the side thereof opposite the tongue 2, the gauge bar 3 is graduated, as at 7, in inches from the marker stud 6 on the corresponding side of said bar.

The means for clamping the gauge bar 3 to the tongue 2, in different adjusted positions comprises a longitudinal central slot 8 in the gauge bar 3, a flat sided bolt 9 slidably extended through said slot 8 and extended through a conforming aperture 10 in the tongue 2, at the end of the tongue remote from the base plate 1, and a washer 11 and nut 12 on said bolt.

A sighting slot 13, of right angled shape, is formed in the longitudinal center of the tongue 2 at the bend, or juncture thereof with the base plate 1 and which extends partway along said tongue and partway along said base plate 1 opposite the cut-out 5, and also opposite the slot 8.

In using the described invention, a pair of panels 14, 15 which are to be connected together in right angular relation by dowel pins are juxtaposed with the outer face 16 of the panel 14 substantially coplanar with one edge 17 of the panel 15, as shown in Figure 4. The face 16 and edge 17 of the panels 14, 15 are then scored, in any suitable manner, in alignment, as shown at 18 in Figure 5, to indicate the desired spacing between the dowel pins, not shown, to be used. The gauge bar 3 is then adjusted on the tongue 2 to space the marker studs 6 from the base plate 1 a distance corresponding to one-half the thickness of the panel 14, or otherwise, if desired. With the base plate 1 set against the face 16 and edge 17 of the panels 14, 15 and the marker stud end of the gauge bar 3 interposed between said panels, as shown in Figure 4, the device is slid along said panels using the sight slot 13 and sighting through the slot 8 to center the base plate 1 relative to the scorings 18 and thereby locate the marker studs 6 in different positions along the panels 14, 15 in accordance with the spacing desired between the dowel pins. In this operation, as will be seen, the cut-out 5 renders the scorings on the panel 14 readily visible. At each location, the panels 14, 15 are pressed together whereby the centers for the dowel pins will be marked in the panels 14, 15 in coincidence, in pairs, with the pairs spaced apart according to the distance desired between the dowel pins, the markings for the centers being formed by indentations caused by pressing the panels against the marker studs 6. As will be seen, adjustment of the gauge bar 3 provides for locating the marker studs 6 transversely on the edge of one panel, the panel 14, and such location of the marker studs 6 may be accurately effected by using the graduations 17 against the underside of the base plate 1 so that panels 14 of different thickness may be marked by the marker studs 6 in the precise center of the edge in which the dowel pins are to be inserted.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

Having described the invention, what is claimed as new is:

1. A device for gauging and spot marking pairs of opposite centers for dowel pins in a pair of juxtaposed panels arranged with top surfaces substantially coplanar and scored to indicate the spacing for said pins, said device comprising a base plate for sliding along said top surfaces, a gauge bar extending through the center of said plate at a right angle thereto for movement along said panels by sliding of said base plate on said panels with one end of said bar interposed between the panels, a pair of aligned markers on said end of said bar and opposite sides thereof for marking the centers on said panels by pressing of the panels against said markers, means for slidably mounting the gauge bar on said plate for endwise adjustment to variably space the markers from said top surfaces and gauge the location for the markings relative to said surfaces, said plate and bar having coincident slots therein for registration with said scorings to center the base plate and gauge on said scorings and thereby locate the markers according to said scorings.

2. A device for gauging and spot marking pairs of opposite centers for dowel pins on a pair of juxtaposed panels arranged with top surfaces substantially coplanar and scored to indicate the spacing for said pins, said device comprising a base plate for sliding along said top surfaces, a gauge bar extending through the center of said plate at a right angle thereto for movement along said panels by sliding of said base plate on said panels with one end of said bar interposed between the panels, a pair of aligned markers on said end of said bar and opposite sides thereof for marking the centers on said panels by pressing of the panels against said markers, means for slidably mounting the gauge bar on said plate for endwise adjustment to variably space the markers from said top surfaces and gauge the location for the markings relative to said surfaces, said plate and bar having coincident slots therein for registration with said scorings to center the base plate and gauge on said scorings and thereby locate the markers according to said scorings, said means comprising a tongue cut out of and struck up from said base plate, said gauge bar being slidably attached to said tongue and slidably fitted in the cut out.

3. A device for gauging and spot marking pairs of opposite centers for dowel pins in a pair of juxtaposed panels arranged with top surfaces substantially coplanar and scored to indicate the spacing for said pins, said device comprising a base plate for sliding along said top surfaces, a gauge bar extending through the center of said plate at a right angle thereto for movement along said panels by sliding of said base plate on said panels with one end of said bar interposed between the panels, a pair of aligned markers on said end of said bar and opposite sides thereof for marking the centers on said panels by pressing of the panels against said markers, means for slidably mounting the gauge bar on said plate for endwise adjustment to variably space the markers from said top surfaces and gauge the location for the markings relative to said surfaces, said plate and bar having coincident slots therein for registration with said scorings to center the base plate and gauge on said scorings and thereby locate the markers according to said scorings, said markers comprising a pair of conical studs.

RICHARD J. ABSHIRE.

REFERENCES CITED

The following references are of record in the file of this patent:

UNITED STATES PATENTS

| Number | Name | Date |
| --- | --- | --- |
| 10,895 | Rogers | May 9, 1854 |
| 1,114,736 | Dick | Oct. 27, 1914 |
| 1,269,811 | Heritage | June 18, 1918 |
| 2,147,511 | Anton | Feb. 14, 1939 |
| 2,408,595 | Beard | Oct. 1, 1946 |